Figure 5:
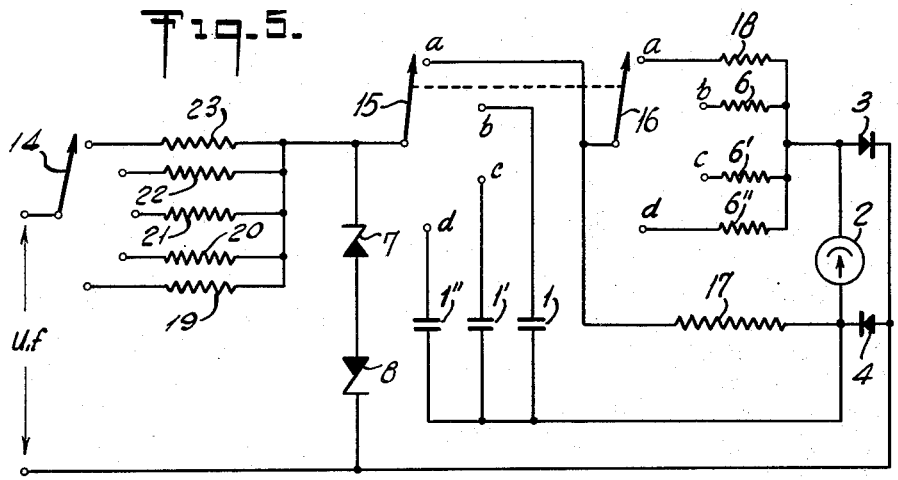

July 27, 1965
M. SANGL ETAL
3,197,701
ZERO SUPPRESSED FREQUENCY METER UTILIZING
THE DISCHARGE CURRENT OF A CAPACITOR
Filed May 18, 1961
3 Sheets-Sheet 1
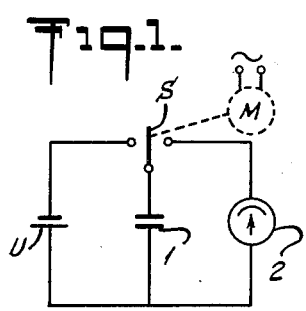
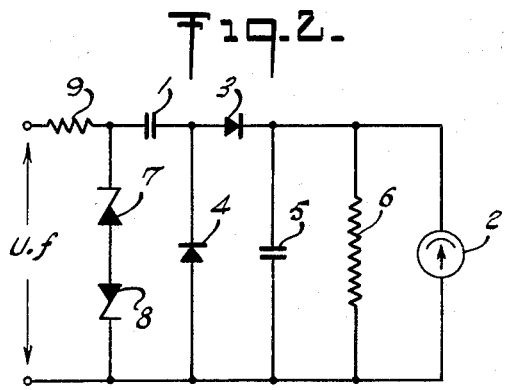
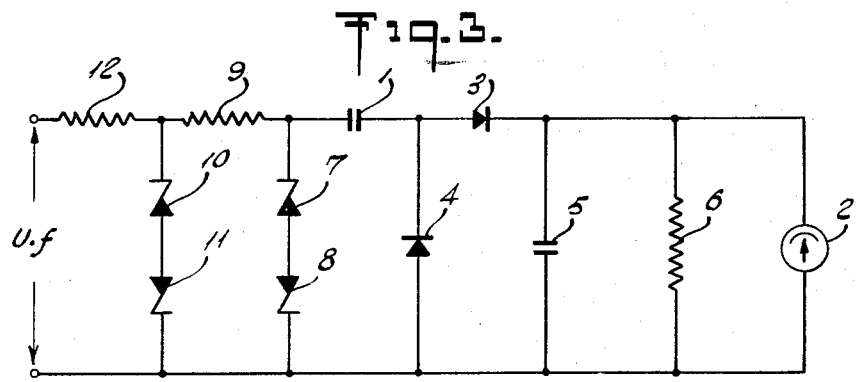
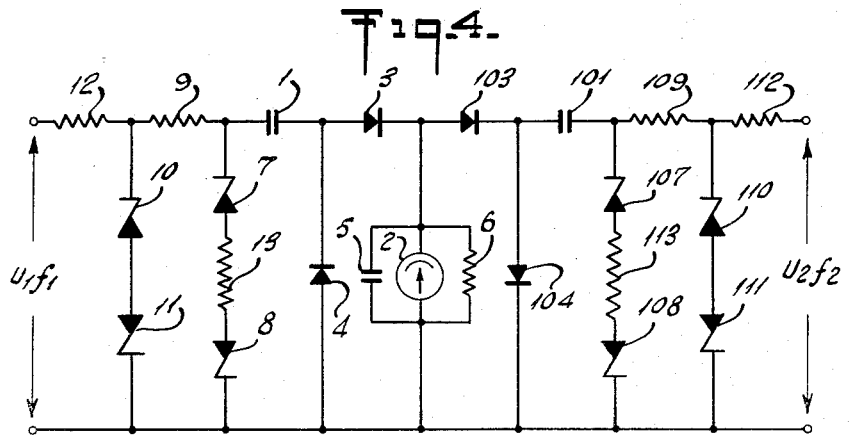
INVENTORS
MICHAEL SANGL
PETER ALBER
BY Nolte & Nolte
ATTORNEYS

United States Patent Office 3,197,701
Patented July 27, 1965

3,197,701
ZERO SUPPRESSED FREQUENCY METER UTILIZING THE DISCHARGE CURRENT OF A CAPACITOR
Michael Sangl and Peter Alber, Erlangen, Germany, assignors to P. Gossen & Co. G.m.b.H., Erlangen, Germany
Filed May 18, 1961, Ser. No. 111,063
Claims priority, application Germany, Jan. 27, 1961, G 31,481
6 Claims. (Cl. 324—78)

This invention relates to frequency meters, and particularly to new switching arrangements for pointer frequency measuring instruments.

The layout of the basic circuit starts from a principle, which is known in itself, for measuring a condenser discharge. According to this principle, a condenser, which is highly constant in its electrical values, is first charged during a voltage half wave with a defined amount of charge and then discharged during the other half wave through a moving coil instrument that measures the arithmetic mean value, such as a D'Arsonval movement. Inversely, the charging current can naturally also be used for the measurement. The frequency and the pulsating direct current traversing the measuring instrument are in a linear relation with each other.

A primary object of this invention is to provide electrical circuits of various designs for controlling an averaging type moving coil instrument to measure various frequency functions.

The manner in which the circuits are arranged for such control is shown in the accompanying drawings, in which:

FIGS. 1 to 12 show various circuit diagrams and graphs of the relationship between related quantities, which are explained in detail in the following specification.

A measuring arrangement according to this principle is represented schematically in FIG. 1. The condenser 1 is charged through a mechanical switch S which is driven for example by a synchronous motor M in synchronism with the applied frequency to be measured, to connect the condenser 1 to the voltage source U, and then to the measuring instrument 2. In one switch position the condenser 1 is thus charged, and in the other position it is discharged through the measuring instrument 2. The respective amount of discharge per cycle is $Q=C.U$ and the discharge current is $J=f.Q=f.C.U$, where $f$ is the frequency, $C$ the capacity and $U$ the voltage applied.

The basic circuit according to the invention is shown in FIG. 2. The measuring condenser 1, a rectifier 3 carrying the discharge current, and the measuring instrument 2 are connected in series. The measuring condenser 1 is charged through a rectifier 4. A condenser 5 serves to attenuate the discharge impulses, and the ohmic resistance 6, connected in parallel with the measuring instrument 2, serves to calibrate the measuring range to the frequency scale and value. The discharge current through the measuring instrument in this arrangement is $J=f.C1.2Um$, where $Um$ denotes the maximum voltage applied to the condenser 1. The factor 2 is based on the fact that the condenser is discharged with the same countervoltage.

The above equation is only correct, however, that is, the frequency measurement is only correct when the time constant $C5.Rg=C5.(Ri.R6)/(Ri+R6)$ is selected to be short relative to the period of oscillation T of the alternating voltage. ($C5$=capacity of the condenser 5.

$$Rg = \frac{Ri \cdot R6}{Ri + R6}$$

$Ri$=ohmic internal resistance of the measuring instrument, and R6 is the value of the resistance 6).

For $C5.Rg$ greater than T, there would obtain a sort of rectifier capacitor operation, that is, a rectification with countervoltage. The frequency meter would then operate as a sort of voltage meter.

According to the equation $J=f.C1.2Um$, the measuring current $J$ is only a definite measure of the frequency $f$, if the voltage $Um$ is kept constant. In the arrangement according to the invention, this requirement is substantially met by two differentially and series-connected Zener diodes 7 and 8. The series input resistor 9 supplies the Zener diodes with an alternating current which is within certain limits proportional to the input voltage. The voltage drop across the Zener diodes is then to a great extent constant in its maximum values $Um$. The temperature-dependence of the Zener voltage and of the voltage $Um$ respectively remains within tolerable limits. The Zener diodes are so selected that the positive temperature variation of the Zener voltage practically compensates the negative temperature variation in the flow direction.

The substantial independence of this frequency measuring circuit from the harmonics results from the fact that increases of the voltage amplitude and of the current amplitudes, respectively, by harmonics in the Zener diode circuit can have practically no effect on the value of $Um$.

In order to increase the voltage-, temperature- and harmonics- independence, the frequency measuring circuit according to FIG. 3, is provided with two additional Zener diodes 10 and 11, likewise connected differentially and in series, and another series input resistor 12. The Zener voltage of the diodes 10 and 11 is greater than that of the diodes 7 and 8. The series resistors 9 and 12 are so dimensioned that both the diodes 7 and 8 and the diodes 10 and 11 are operated outside their Zener break, that is, in the rectilinear portions of their characteristics.

FIG. 4 shows the circuit of a very accurately operating differential frequency meter which indicates the difference of two independent frequencies, and which finds one field of use in the synchronization of generators. This differential frequency meter represents substantially a combination of two single frequency meter circuits, according to FIG. 3, but arranged in differential connection. In such a combination the main difficulty lies in the exact compensation, since the capacitors 1 and 101, as well as the Zener voltages of the individual pairs of Zener diodes are practically never exactly equal.

The measuring- and the output current respectively of the individual circuits must coincide exactly in dependence on the frequency. This coincidence can be achieved very simply and advantageously, according to the invention, by an ohmic balancing resistor 13 or 113. If, with equal frequencies $f1$ and $f2$, the output current of the frequency measuring circuit for $f2$ is greater than that for $f1$, the equalization of the output currents can be established by the resistor 13 and in the opposite case by the resistor 113. Without impairing substantially the voltage-, temperature- and harmonics-resistances, these two resistors 13 and 113 raise the maximum voltages $Um$ of the respective associated condensers and thus the respective output current. To isolate the two networks (U1, $f1$) and (U2, $f2$), disconnecting transformers can be arranged ahead of these differential frequency meter circuits.

A multiple-range voltage-and-frequency meter built on the basic circuit, according to the invention, is represented in FIG. 5. Such a combination is suitable particularly for portable measuring instruments. This arrangement has a voltage range switch 14, and a frequency selector switch provided with two selector switches 15 and 16. In the frequency selector switch position $a$, voltages are measured, and in the positions $b$, $c$, and $d$ frequencies are measured, for example, in the ranges 0 . . . 100, 0 . . . 1,000 and 0 . . . 10,000 c.p.s. Thus, with unknown input voltages, the voltage measurement can precede a frequency measurement.

The voltage measurement is based here on a rectifier-bridge connection with resistors, consisting of two equal resistors 17 and 18 and of the two rectifiers 3 and 4. The bridge resistors 17 and 18 are so dimensioned that their nominal voltage drop remains less than the Zener voltage of the Zener diodes 7 and 8, required for the frequency measurement. The series resistors 19 to 23 are employed to balance the various voltage ranges. In the voltage measurements the Zener diodes 7 and 8 serve to protect the measuring instrument at the same time against overloads.

According to the invention, the three frequency measuring ranges are so combined in the positions b, c and d of the selector switches 15 and 16 with the above described voltage measuring circuit that the frequency measurement requires in addition merely the three measuring condensers 1, 1', 1'' and three ohmic balancing resistors 6, 6', 6'' arranged for individual parallel connection to the measuring instrument. The bridge resistor arm 17, series-connected with any one of these balancing resistors, has as a bridge resistance such a low ohmic value that it cannot impair the frequency compensation. As it can be seen from FIG. 5, the principle of this frequency measurement corresponds to that of the basic circuit in FIG. 2. The charging of the condensers 1, 1' and 1'' is effected here over the rectifier 4 and the discharge over the rectifier 3 and the measuring instrument 2.

Figure 6:
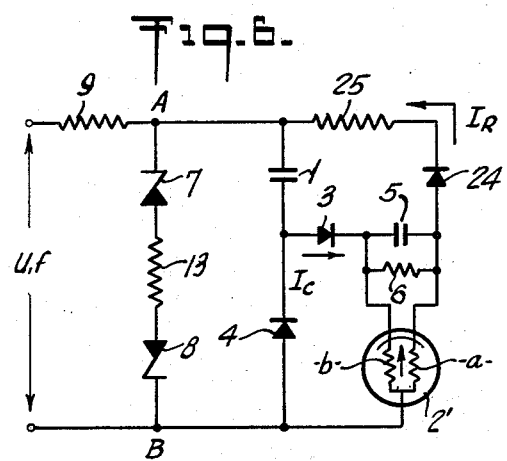

The arrangement shown in FIG. 6 shows the essentials of a principal frequency value meter. By principal value meter is meant in the present case a frequency meter where the electrical initial or zero range is suppressed and which indicates a relatively narrow measuring range about the nominal frequency value of a range spaced from the zero range in an effectively expanded scale.

This arrangement in FIG. 6 is developed from the basic circuit of FIG. 2, with FIG. 6 being provided additionally with a rectifier 24 and a resistor 25. These two components serve both to suppress and to compensate for the initial or zero range of the instrument scale. In addition, a double-wound moving coil instrument 2' is here used to actuate the indicator.

At the points A and B in FIG. 6 an alternating voltage with a relatively pronounced rectangular form is formed. If at a certain time point A has, for example, a negative potential, and point B a positive potential, the measuring condenser 1 is charged through the rectifier 4. At the same time an ohmic current $I_R$ flows through the one half $a$ of the double-wound moving coil 2', the rectifier 24, and the resistor 25. During the other half wave, however, a current $I_C$ flows to the condenser 1, the rectifier 3 and the other half $b$ of the moving coil.

The arithmetic mean value of $I_R$ flowing through a resistive circuit is frequency-independent of these currents, while the arithmetic mean value of $I_C$ through the capacitive circuit depends in known manner on the value of the frequency to be measured. The effective measuring current $I_M$ results from the difference of the two current $I_C$ and $I_R$. According to the invention, the damping condenser 5 and the balancing resistance 6 are parallel to the free ends of the double-wound moving coil.

Figure 7:
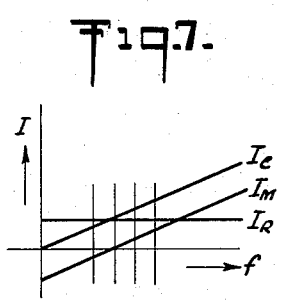

In the diagram represented in FIG. 7, the currents $I_C$, $I_R$ and $I_M$ are plotted as a function of the frequency $f$. At the point B of the graph, $I_C$ and $I_R$ are equal ($I_M=0$). This point can be arranged by corresponding adjustment of the resistor 25 to calibrate the instrument either at the top or at the center of the scale. In the former case, the measuring range extends from B to D, and in the second case from A to C. The end point of the scale can be balanced by means of the resistor 6, while the condenser 5 serves again to attenuate the current impulses as in the circuit of FIG. 2.

The influence of harmonics is negligibly small in this arrangement too, because only the base regions of the half waves at the input terminals, which are obtained by the function of the Zener diodes, serve to form the reading value. The form distortions of the upper regions of the measuring half waves, affected by a possible share of the harmonics, have practically no effect. The temperature range of the Zener diodes, which has an opposite sign in the forward and in the Zener range, is compensated by the differential connection of the diodes.

The influence of the voltage is naturally greater in principal value-frequency meters than in wide range frequency meters, since a relatively narrow frequency range is indicated in a greatly expanded scale. While in the wide range frequency meters accuracies of 0.5 . . . 1% error of the scale end values are customary, accuracies of 0.1 . . . 0.5% error must be required of the end value for principal value-frequency meters, depending on the width of the indicating range. This requirement could be met very simply in view of the voltage influence by the ohmic resistance 13 in FIG. 6. In order that the method of operation of this resistor may be understood, the formation of the voltage effect in this arrangement will be described.

Figures 8, 9:
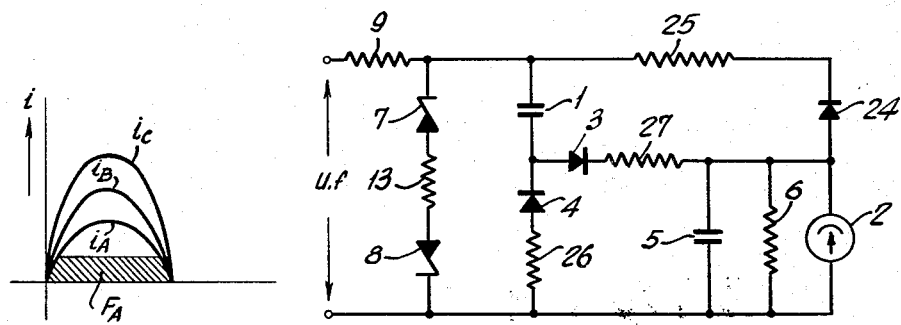

With constant frequency the arithmetic mean value of the condenser current, $I_C$ depends only on the maximum voltage $Um$, that is, on the maximum voltage drop across the two Zener diodes 7 and 8. The voltage drop across the Zener diodes increases only slightly with the current intensity of the input current, starting from a certain limit. The arithmetic mean value of the current $I_R$, on the other hand, results from the current-time areas of the negative half wave, limited by the Zener diodes, through the rectifier 24, the resistor 25 and the measuring instrument 2'. As can be seen from FIG. 8, the current-time area increases and with its $I_R$ through the resistor 13, with increasing input voltage and increasing input current, respectively, more than $I_C$. FIG. 8 shows the input currents $i_A$, $i_B$ and $i_C$ for under-, nominal- and over-voltages and only the effective time-current area $F_A$.

From the greater increase of $I_R$ with input voltage, the difference of the two currents $I_C-I_R$ results in a negative reading error in dependence on the input voltage. This error can be eliminated, according to the invention, by the ohmic resistor 13 series-connected with the two Zener diodes. Properly dimensioned, this resistor raises the maximum voltage $Um$ at the condenser 1, in dependence on the input voltage and in such a way that the increase of the maximum voltage $Um$ and of the current $I_C$, respectively, is equal, within wide limits, to the increase of the current time area and to the increase of the current $I_R$.

FIG. 9 shows an arrangement which corresponds substantially to that shown in FIG. 6. It differs from the latter in that the double-wound moving coil of the measuring instrument is replaced by a single-wound moving coil. But, due to this measure, a path is formed for the negative half wave over the rectifiers 3 and 4. In this parallel path are arranged additionally the stabilizing resistors 26 and 27. If they were not present, the nonlinear and temperature- dependent rectifier forward resistances would cause considerable reading errors which are now kept within tolerable limits by the resistors 26 and 27. They are so dimensioned that the sum of their resistance values in operation is great, compared to the rectifier forward resistances. This means that the parallel path to the measuring mechanism represents a practically constant resistance.

Figure 10:
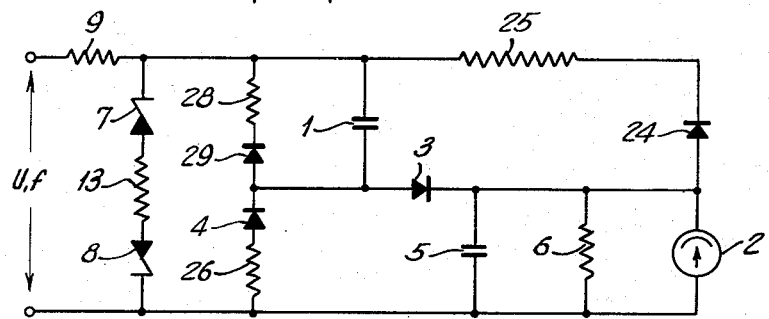

FIG. 10 shows a further development of the arrangement according to FIG. 9, but which is more sensitive and which is also easier to balance. Here the parallel path to the measuring instrument is blocked for the negative half wave, according to the invention, by the resistors 26 and 28 and the rectifier 29. These resistors are so dimensioned that the voltage drop during the negative half wave on the resistor 26 is always greater than the voltage on the measuring instrument. Thus, a blocking voltage is formed during the negative half wave on the rectifier 3 which blocks the path parallel to the measuring instrument. The resistor 28 is selected of high resistance so that the measuring condenser 1 can discharge only to a minor extent during the reversal of the voltage.

Figure 11:
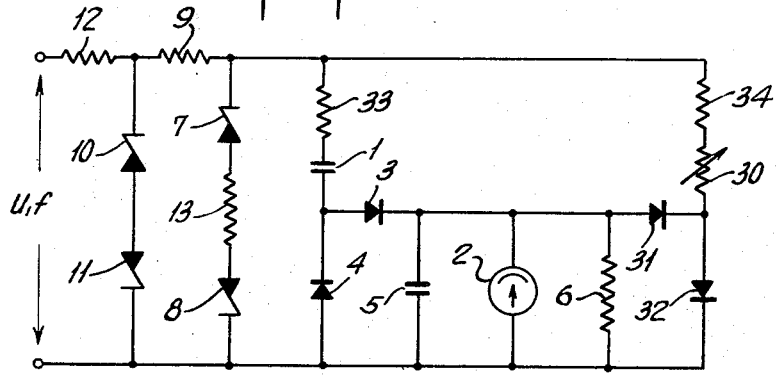
Figure 12:
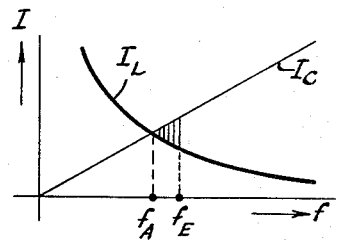

The arrangement represented in FIG. 11 shows a very accurately operaitng frequency meter with twice the sensitivity compared to the design shown in FIG. 10. This high sensitivity is achieved here by a second frequency-dependent element, namely the inductor 30. According to the graphic representation in FIG. 12, the condenser current $I_C$ rises with increasing frequency while current $I_L$ through the inductor decreases. The difference $I_C - I_L$ is here the measure of the frequency. The intersection of the two curves corresponds to the electrical zero point of the indicator when C and L are in resonance. The indicating range is then between the two points $f_A$ and $f_E$.

The resistor 13 in this arrangement of FIG. 11 has principally the same function as in the arrangements according to FIGS. 6, 9 and 10. However, instead of the term current-time area, we use here the term voltage-time area, which represents an equivalent to the arithmetic mean value of $I_L$. The arrangement according to FIG. 11, however, does not result simply from replacing the ohmic resistor 25 by an inductor in the arrangement of FIG. 10. In the arrangement according to FIG. 10, that inductor would have no effect, since it would be traversed there only by direct current. In the arrangement of FIG. 11, a rectangular alternating voltage is applied at the inductor as well as at the condenser 1. The condenser 1, and the inductor 30 thus form a parallel resonance circuit. One half wave of the oscillatory current traverses the rectifiers 3 and 31 and the other traverses the rectifiers 4 and 32. The measuring instrument receives the reading value, the difference $I_C$ minus $I_L$ of FIG. 12.

To increase the frequency sensitivity further, a series connection of a condenser and an inductance could be used instead of the condenser 1.

A further improvement of the voltage independence of the frequency reading is effected by the ohmic resistor 33 in series with the measuring condenser 1. In the ideal case, the total resistance, consisting of the ohmic internal resistance of the condenser 1, plus that of the resistor 33, must be equal to the total resistance consisting of the ohmic internal resistance of the choke 30 and of the resistor 34. This can be readily seen if these total resistances are transformed parallel to the respective reactance and if the reactances be considered eliminated. If the transformed total resistances were unequal, there would obtain a deflection of the instrument which in turn depends on the size of the voltage-time area applied to the resistors.

Of decisive importance for the formation of the difference $I_C - I_L$ is the capacitor 5. While the capacitor 5, in the preceding arrangements, serves primarily to attenuate the measuring mechanism, here it keeps additionally the parallel path to the measuring instrument blocked over the rectifiers 31 and 32 during the discharge of the measuring condenser 1. The capacitor 5 is so selected that the voltage formed thereon does not exceed the threshold voltage of the rectifier 32.

The calibration of the scale is effected by means of the ohmic resistor 34. It permits displacement of the curve $I_L$ in FIG. 12, and thus also the intersection of the two curves $I_L$ and $I_C$. The calibration of the scale end value is again effected with the resistor 6.

What is claimed is:

1. A movable coil, suppressed zero frequency meter, wherein the discharge of a capacitor through the meter coil is related to the frequency applied thereto, comprising a capacitor, a charging rectifier connected thereto for charging said capacitor only in response to input voltages of a first polarity, a meter coil, a discharge rectifier series connected with said capacitor to apply discharge voltages of said first polarity to said meter coil, a third rectifier and a resistor connected between one end of said meter coil and said capacitor for maintaining an opposite current flow to said meter coil at a substantially constant value when said input voltage is at the other polarity, and a voltage stabilizing branch connected in parallel with said capacitor and charging rectifier, said branch comprising a pair of oppositely poled zener diodes and a limiting resistance series connected therebetween.

2. A frequency meter according to claim 1, wherein said meter coil includes two wound portions, one portion being connected to said discharge rectifier and responsive to voltages of said first polarity, and the other portion being connected to said third rectifier and responsive to voltages of said other polarity.

3. A frequency meter according to claim 1, wherein said meter includes a single coil, and a resistance connected in a branch between said one end of said coil and the junction of said third rectifier and the other end of said coil, said last named resistance being high relative to the forward resistance of said charge and discharge rectifiers.

4. A frequency meter according to claim 1, including a rectifier and resistance series connected across said capacitance, and a resistance connected between the other end of said coil and said charging rectifier.

5. A frequency meter according to claim 1, wherein an inductive branch is connected in parallel with the capacitance branch, the D.C. resistances of said branches being substantially the same, said meter coil having first and second terminals, said third rectifier being connected between said first terminal of said meter coil and said inductive branch for maintaining an opposite current flow to said meter at a substantially constant value when said input voltage is at the other polarity, and a second pair of oppositely poled, series connected zener diodes is connected in parallel with said first pair of zener diodes.

6. A frequency meter according to claim 5, including a second capacitance connected across said coil, and a rectifier connected between said other end of said coil and said inductive branch, said capacitance having a sufficient value so that the voltage thereacross cannot exceed the threshold value of said last named rectifier.

References Cited by the Examiner

UNITED STATES PATENTS

| 2,762,974 | 9/56 | Pulsford | 324—78 |
| 2,904,690 | 9/59 | Kraayeveld. | |
| 2,944,215 | 7/60 | Corson | 324—78 X |
| 2,947,941 | 8/60 | Corson et al. | 324—119 X |
| 3,004,220 | 10/61 | Williamson | 324—78 |

FOREIGN PATENTS 837,887   5/52   Germany.

OTHER REFERENCES

The Cornell Dubilier Capacitor, May 1957, volume 22, No. 5, page 5.

WALTER L. CARLSON, *Primary Examiner.*

SAMUEL BERNSTEIN, *Examiner.*